Patented July 22, 1947

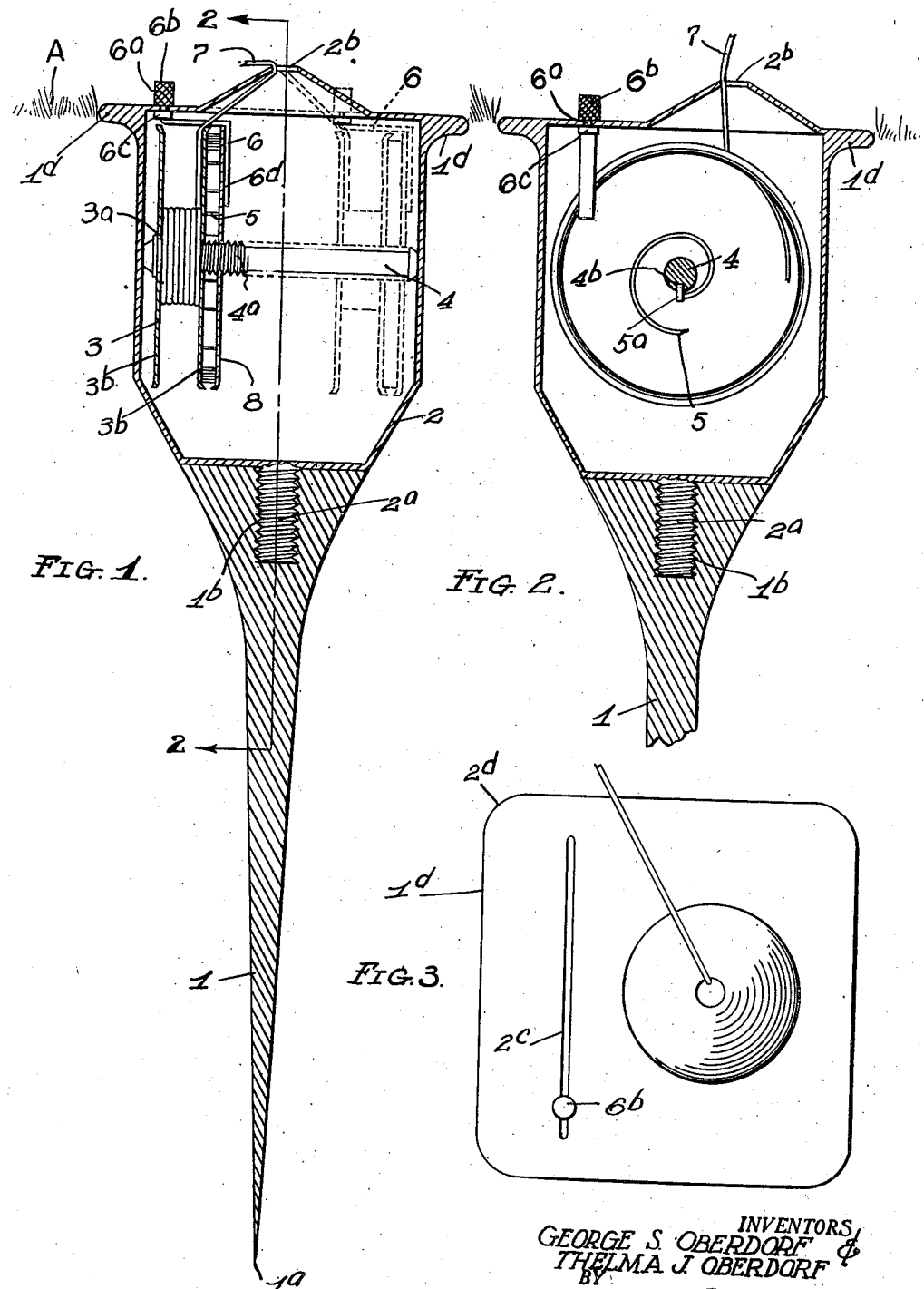

2,424,368

UNITED STATES PATENT OFFICE 2,424,368

RETRACTIBLE LEASH

George S. Oberdorf and Thelma J. Oberdorf,
Chula Vista, Calif.

Application April 2, 1945, Serial No. 586,072

7 Claims. (Cl. 242—107)

Our invention relates to a retractible leash, more particularly for use in tethering children in a certain locality such as a yard or grounds adjacent the house where they may be readily observed as desired and the objects of our invention are:

First, to provide a leash of this class which may be anchored in the ground in practically any desired location;

Second, to provide a leash of this class in which the radius of the leash cord may be adjusted as desired, whereby a child controlled thereby is limited to a certain area in his wanderings;

Third, to provide a leash of this class in which the leash cord is maintained in tension by resilient means whereby the entanglement of the child by the leash cord is not frequent;

Fourth, to provide a leash of this class which is very compact and may be useful when on a picnic or at the beach for preventing children from being lost or getting into harmful circumstances;

Fifth, to provide a leash of this class which is so designed that it makes a very rigid anchorage in the ground whereby relatively heavy and strong animals may be tethered without danger of said animals breaking away from the tether anchorage;

Sixth, to provide a leash of this class from which the leash cord projects from the casing member very close to the surface of the ground providing a tethering means which does not entangle the leash cord when moved around the same.

Seventh, to provide a leash of this class in which the casing is so designed that it forms a portion of the anchorage as well as the leash cord fairlead; and Eighth, to provide a leash of this class which is very simple and economical of construction, efficient in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a vertical longitudinal sectional view of our retractible leash shown in relationship with the surface of the ground and illustrating parts and portions in elevation to facilitate the illustration and further showing by dash lines a varying position of parts and portions thereof; Fig. 2 is a fragmentary sectional view taken from the line 2—2 of Fig. 1 and Fig. 3 is a top or plan view of our retractible leash.

Similar characters of reference refer to similar parts and portions throughout the several views of the drawings:

The spike 1, casing 2, reel 3, axle 4, spring 5, adjustable stop 6 and the leash cord 7 constitute the principal parts and portions of our retractible leash.

The spike 1 is provided with a sharp point 1a and an internally screw-threaded portion 1b in which is positioned the screw-threaded bolt portion 2a of the casing 2.

The casing 2 is a hollow substantially rectangular casing having round corners 2d, as shown in Fig. 3 of the drawings at its upper flange edge portion 1d, as shown best in Figs. 1 and 2 of the drawings. Fixed in this casing 2 is the axle 4 having external screw-threads 4a engaged by the hub 3a of the reel 3. Secured to the hub 3a are spaced disk members 3b between which the leash cord 7 is wound over the hub 3a. This leash cord 7 extends through a fairlead opening 2b in the upper side of the casing 2, all as shown best in Fig. 1 of the drawings.

The spring 5 is provided with a small key member 5a on its one end engageable with the longitudinal slotted portion 4b of the axle 4, as shown best in Fig. 2 of the drawings. This spring 5 is a coil spring and the opposite end thereof is secured in connection with the reel 3 tending to rotate the reel about the axis of the axle 4.

The disk 8 is revolubly mounted on the axle 4 and is secured to the opposite side of the spring 5 from the reel 3 at the periphery thereof for retaining said spring 5 in the form of a flat coil when traversing the axle 4.

It will be noted that the inner end of the leash cord 7 is rigidly connected to the spool 3 and that the spring 5 tends to retract the leash cord 7 and wind the same upon the spool 3.

The adjustable stop 6 is provided with a set screw 6a having a knurled head 6b located at the upper side of the casing 2. The set screw 6a is screw-threaded in the nut portion 6c on the opposite side of the upper casing wall from the knurled head 6b.

As shown in Fig. 3 of the drawings, the casing 2 is provided with a slotted portion 2c arranged in parallel relation with the axle 4 so that the adjustable stop 6 may be arranged in such position and different location longitudinally of the axle 4 for limiting the travel of the spool 3 on the screw-threads 4a of said axle 4 as the leash cord 7 is extended and causes the spool 3 to rotate.

As shown in Fig. 3 of the drawings, the knurled head 6b of the set screw 6a may be positioned at various locations throughout the length of the slot 2c in the upper side of the casing 2.

The operation of our retractible leash is substantially as follows: Assuming that the spike 1 is pressed into the ground and the casing 2, as shown in Fig. 1 of the drawings, bears the submerged relationship with the ground level A, a child or pet may be secured in connection with the leash cord 7. The adjustable stop 6 may be set in the desired position and secured by means of the set screw 6a depending upon the length of radius permissible for use in the immediate area. The adjustable stop may be released by means of a set screw 6a and the leash cord 7 may be extended to the desired length of radius; then the adjustable stop 6 may be set in place by means of a set screw 6a limiting the radial travel of the child or pet secured to our retractible leash.

In operation the spring 5 maintains the leash cord 7 in tension preventing the child or pet from becoming entangled in the loose cord at all times. This spring 5 is secured to the reel 3 at one end and traverses the slotted portion 4b of the axle 4 at its other end by means of the key member 5a secured on the opposite end of the spring 5. The screw-threaded relation of the reel hub 3a with the screw-threads 4a of the axle 4 causes the reel to pass longitudinally of the axle 4 when rotated by extension of the leash cord 7 or retraction thereof by tension of the spring 5. The end portion 6d of the adjustable stop 6 extends downwardly into the casing 2 in interfering relation with the reel 3 tending to engage the same and limit the longitudinal movements thereof on the axle 4 as desired whereby the extension of the leash cord 7 is proportionately limited.

Though we have shown and described a particular construction, combination and arrangement of parts and portions, we do not wish to be limited to the particular construction, combination and arrangement, but desire to include in the scope of our invention the construction, combination and arrangement substantially as set forth in the appended claims.

Having thus described our invention, what we claim as new and desire to secure by Letters Patent is:

1. In a retractible leash of the class described, the combination of a spike adapted to be driven into the ground, a rotatable reel in connection therewith, a cord in connection with said reel and wound thereon, an axle for said reel having external screw-threads thereon the hub portion of said reel having internal screw threads engageable with the external screw threads of said axle and adjustable stop means adjustable longitudinally of the axis of said axle engageable with said reel for limiting the radial extension of said cord.

2. In a retractible leash of the class described, the combination of a spike adapted to be driven into the ground, a rotatable reel in connection therewith, a cord in connection with said reel and wound thereon, an axle for said reel having external screw threads thereon, the hub portion of said reel having internal screw threads engageable with the external screw threads of said axle and adjustable stop means adjustable longitudinally of the axis of said axle engageable with said reel for limiting the radial extension of said cord, and spring means engageable with said axle and said reel for maintaining said cord in tension and tending to wind the same on said reel.

3. In a retractible leash of the class described, the combination of a spike, a casing secured thereto having its upper side partially enclosed and provided with a fairlead opening therein, a reel rotatably mounted in said casing and a cord secured in connection therewith and wound thereon and extending through said fairlead in the upper side of said casing, said spike and casing being so formed that they may be driven into the ground until the upper side of the casing is nearly flush with the surface of the ground.

4. In a retractible leash of the class described, the combination of a spike, a casing secured thereto having its upper side partially enclosed and provided with a fairlead opening therein, a reel rotatably mounted in said casing and a cord secured in connection therewith and wound thereon and extending through said fairlead in the upper side of said casing, said spike and casing being so formed that they may be driven into the ground until the upper side of the casing is nearly flush with the surface of the ground, and an axle secured in said casing upon which said reel is rotatably mounted, spring means engageable with said axle and said reel tending to rotate said reel and retract said cord.

5. In a retractible leash of the class described, the combination of a spike, a casing secured thereto having its upper side partially enclosed and provided with a fairlead opening therein, a reel rotatably mounted in said casing, a cord secured in connection therewith and wound thereon and extending through said fairlead in the upper side of said casing, said spike and casing being so formed that they may be driven into the ground until the upper side of the casing is nearly flush with the surface of the ground, an axle secured in said casing upon which said reel is rotatably mounted, spring means engageable with said axle and said reel tending to rotate said reel and retract said cord, said axle having external screw-threads thereon, said reel having internal screw threads engageable with the external screw threads of said axle whereby said reel moves longitudinally of said axle during rotation and stop means adjustable in parallel relation with the axis of said axle and arranged in interfering relation with said reel for limiting the number of revolutions of said reel on said axle as desired maintaining certain radial extension of said cord.

6. In a leash of the class described a spike adapted to be driven into the ground, a reel in connection therewith, a casing for said reel secured to said spike, a cord wound upon said reel and spring tension means tending to retract said cord by rotating said reel, said spike and casing being so formed that they may be driven into the ground until the upper side of the casing is nearly flush with the surface of the ground.

7. In a retractible leash of the class described the combination of a spike adapted to be driven into the ground, a rotatable reel in connection therewith, a cord in connection with said reel and wound thereon and a casing for said reel secured to said spike, said spike and casing being so formed that they may be driven into the ground until the upper side of the casing is nearly flush with the surface of the ground.

GEORGE S. OBERDORF.
THELMA J. OBERDORF.

REFERENCES CITED

The following references are of record in the file of this patent:

UNITED STATES PATENTS

| Number | Name | Date |
|---|---|---|
| 175,446 | Francis | Mar. 28, 1876 |
| 184,663 | Reichert | Nov. 21, 1876 |
| 1,738,581 | Hodgson | Dec. 10, 1929 |
| 362,304 | Metzger | May 3, 1887 |
| 1,854,103 | Buhrie | Apr. 12, 1932 |

FOREIGN PATENTS

| Number | Country | Date |
|---|---|---|
| 106,329 | Switzerland | Aug. 16, 1924 |